(12) United States Patent
Cavaliere et al.

(10) Patent No.: US 10,056,980 B2
(45) Date of Patent: Aug. 21, 2018

(54) METHOD OF CONTROLLING THE GENERATION OF A COHERENT OPTICAL SIGNAL AND COHERENT OPTICAL SIGNAL CONTROL APPARATUS

(71) Applicant: Telefonaktiebolaget LM Ericsson (publ), Stockholm (SE)

(72) Inventors: Fabio Cavaliere, Pisa (IT); Francesco Fresi, Pisa (IT); Gianluca Meloni, Pisa (IT); Luca Poti, Pisa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/528,392

(22) PCT Filed: Nov. 20, 2014

(86) PCT No.: PCT/EP2014/075064
§ 371 (c)(1),
(2) Date: May 19, 2017

(87) PCT Pub. No.: WO2016/078705
PCT Pub. Date: May 26, 2016

(65) Prior Publication Data
US 2017/0324481 A1    Nov. 9, 2017

(51) Int. Cl.
*H04B 10/50* (2013.01)
*H04B 10/079* (2013.01)

(52) U.S. Cl.
CPC ..... *H04B 10/5057* (2013.01); *H04B 10/0795* (2013.01); *H04B 10/0799* (2013.01)

(58) Field of Classification Search
CPC ............ H04B 10/25–10/2572; H04B 10/5057–10/50597
See application file for complete search history.

(56) References Cited

U.S. PATENT DOCUMENTS 8,265,491 B2 * 9/2012 Zhou .......... H04B 10/2513
398/202
2009/0028578 A1   1/2009 Sun et al.
(Continued)

FOREIGN PATENT DOCUMENTS

EP    1933479 A1    6/2008
EP    2634934 A1    9/2013
(Continued)

OTHER PUBLICATIONS

PCT International Search Report, dated Jul. 24, 2015, in connection with International Application No. PCT/EP2014/075064, all pages.
(Continued)

*Primary Examiner* — David Payne
*Assistant Examiner* — Casey Kretzer
(74) *Attorney, Agent, or Firm* — Leffler Intellectual Property Law, PLLC

(57) ABSTRACT

A method of controlling a parameter in the generation of a coherent optical signal, the method comprising the steps of: receiving a set of signal samples relating to detection of a coherent optical signal; transforming the set of signal samples into a set of spectrum samples in the frequency domain, the set of spectrum samples being an estimation of the spectrum of the coherent optical signal; calculating at least one feedback variable based on the spectrum samples; and adjusting the parameter based on the at least one feedback variable.

13 Claims, 12 Drawing Sheets

(56) References Cited

U.S. PATENT DOCUMENTS

| | | | |
|---|---|---|---|
| 2012/0224847 A1 | 9/2012 | Ibragimov et al. | |
| 2014/0169802 A1* | 6/2014 | Magri | H04B 10/541 |
| | | | 398/183 |
| 2014/0341587 A1* | 11/2014 | Nakashima | H04B 10/2572 |
| | | | 398/115 |
| 2015/0037034 A1* | 2/2015 | Renaudier | H04L 1/0035 |
| | | | 398/65 |

FOREIGN PATENT DOCUMENTS

| | | | | |
|---|---|---|---|---|
| EP | 2634935 A1 | 9/2013 | | |
| WO | 2006008321 A1 | 1/2006 | | |
| WO | WO 2012/163419 | * | 6/2012 | H04B 10/541 |
| WO | 2012163419 A1 | 12/2012 | | |
| WO | WO 2013/114629 | * | 8/2013 | H04B 10/2572 |

OTHER PUBLICATIONS

PCT Written Opinion, dated Jul. 24, 2015, in connection with International Application No. PCT/EP2014/075064, all pages.

\* cited by examiner

METHOD OF CONTROLLING THE GENERATION OF A COHERENT OPTICAL SIGNAL AND COHERENT OPTICAL SIGNAL CONTROL APPARATUS

TECHNICAL FIELD

The invention relates to a method of controlling a parameter in the generation of a coherent optical signal. The invention also relates to coherent optical signal control apparatus, a coherent optical receiver and a coherent optical transmission system.

BACKGROUND

Coherent optical transmission offers several advantages in long haul dense wavelength division multiplexing, DWDM, networks; link distances of thousands of kilometers are achievable with cost effective single stage optical amplifiers and without chromatic dispersion compensation in line, and improved spectral efficiency is obtainable using sub-Nyquist modulation and coding, e.g. Time-Frequency Packing.

Spectral efficiency is a key feature also in optical interconnection systems, where transmitting more capacity per line helps to decrease the number of cables, which is an issue in modern data centres, having hundreds or thousands of connected servers and storage units.

Due to modulation complexity, any spectrally efficient modulation format is very sensitive to the non-linear response of the optical modulator, which means that low driving voltage levels must be used, decreasing the signal to noise ratio tolerance of the system. Optimal settings of the voltage level depend on the link characteristics, for example, accumulated amplification noise, and require long calibration procedures in field. In meshed DWDM networks, where channel paths can be rerouted in traffic, a calibration for a first path will not be valid for a new path, leading to additional system penalty that could be avoided in principle by dynamically readjusting the modulator driving voltage.

The simplest and typical way to use digital to analogue converters, DACs, is to configure and calibrate them manually during system installation, for example, by loading one of a set of preconfigured filter shapes and setting the bandwidth. This is a very suboptimal way to use DACs, which generally makes the additional transmitter cost and installation complexity of using DACs not worthwhile, given that the optical link characteristics can change for several reasons. Rerouting an optical channel through a reconfigurable optical add-drop multiplexer, ROADM, onto a different path is a typical case. Being able to reconfigure the frequency response of a DAC would allow the channel throughput to be maximized for the new link or to maximize channel performance when the link propagation conditions changes, for example due to interfering spectrally adjacent channels being added.

An optical transmitter is described in WO 2012/163419 which has a modulator for modulating data onto an optical signal, for transmission to a receiver, and a tuning controller for tuning automatically the modulator to adjust the modulation based on a received feedback signal. The modulated signal has components at one or more constellations of points of different optical amplitudes and phases. The feedback signal indicates a distortion of one or more of the constellation points measured at the receiver. The tuning controller tunes the modulator to adjust the modulation based on the feedback signal to pre-compensate for the measured distortion.

SUMMARY

It is an object to provide an improved method of controlling a parameter in the generation of a coherent optical signal. It is a further object to provide an improved coherent optical signal control apparatus. It is a further object to provide an improved coherent optical receiver. It is a further object to provide an improved coherent optical transmission system.

A first aspect of the invention provides a method of controlling a parameter in the generation of a coherent optical signal. The method comprises the following steps. Receiving a set of signal samples relating to detection of a coherent optical signal. Transforming the set of signal samples into a set of spectrum samples in the frequency domain, the set of spectrum samples being an estimation of the spectrum of the coherent optical signal. Calculating at least one feedback variable based on the spectrum samples. Adjusting the parameter based on the at least one feedback variable.

The method may enable control of a parameter in the generation of a coherent optical signal in response to the spectrum of the coherent optical signal when detected. The method takes advantage of the spectrum of a coherent optical signal typically varying slowly to calculate a feedback variable based on frequency domain spectrum samples, which may enable a more accurate feedback variable to be calculated. This may enable more accurate control of the parameter. The method may enable reconfiguration of transmission characteristics following a change in the propagation conditions experienced by the coherent optical signal. The method may allow a coherent optical signal to be configured to increase system margins during regular coherent optical channel operation. The method may allow the performance of a coherent optical channel to be optimized without incurring the costs required to perform manual calibration during installation. In an embodiment, the signal samples are equalizer output signals relating to detection of the coherent optical signal. The method comprises storing the equalizer output signals in a memory. The step of transforming the set of signal samples comprises performing a Fourier transform on the stored equalizer output signals.

The method may be implemented without requiring additional sampling of the detected coherent optical signal. Specifically, the method may be implemented using the equalizer output signals ("taps") generated during digital signal processing, DSP, following the detection of the coherent optical signal at a coherent receiver.

In an embodiment, the step of transforming the set of signal samples comprises calculating an impulse response of the coherent optical signal from the equalizer output signals and the Fourier transform is performed on the impulse response.

In an embodiment, the parameter comprises a driving voltage for an optical modulator used to generate the coherent optical signal. The method may control a nonlinear response of the optical modulator and thus the signal-to-noise ratio of the coherent optical signal. The method may enable reconfiguration of transmission characteristics following a change in the propagation conditions experienced by the coherent optical signal.

In an embodiment, the parameter comprises a driving voltage for an IQ modulator used to generate the coherent optical signal. The method may be used to control an optical modulator configured to apply quadrature phase-shift keying, QPSK, and dual-polarisation QPSK, DP-QPSK, modulation formats.

In an embodiment, the at least one feedback variable comprises a non-linear modulation index. The non-linear modulation index comprises a ratio of an effective bandwidth, $B_{eff}$, of the coherent optical signal at detection and a predefined ideal effective bandwidth, $B_{ideal}$, of the coherent optical signal at an output of a predefined ideal optical modulator. The effective bandwidth is calculated based on the spectrum samples. The driving voltage is adjusted in inverse proportion to the non-linear modulation index.

The method may enable the spectrum calculated by the equalizer at the coherent receiver to be used to estimate spectral broadening due to any non-linearity in an optical link that the coherent optical signal has been transmitted across and, based on this, provide a feedback variable to optimize the modulator driving voltage. The non-linear modulation index may be calculated at the receiver, exploiting DSP features usually present but used for different purposes. The method may enable the performance of an optical coherent channel to be optimized, avoiding the usual costs of manual calibration at channel installation and increasing system margins during regular channel operation.

In an embodiment, the non-linear modulation index, NLMI, is given by:

$$NLMI = \frac{B_{eff}}{B_{ideal}} = \frac{1}{B_{ideal}T} \frac{\sum_{n=1}^{N} n|h_n|^2}{\sum_{n=1}^{N} |h_n|^2},$$

where T is a time window over which the Fourier transform is performed, N is the number of samples on which the Fourier transform is performed, and $h_n$ are the spectrum samples.

In an embodiment, the method is iterated. The value of the NLMI generated at each iteration is compared to the value of the NLMI obtained at the previous iteration until the two compared NLMI values converge to within a predetermined target accuracy limit. The method may enable the performance of an optical coherent channel to be optimized, avoiding the usual costs of manual calibration at channel installation and increasing system margins during regular channel operation.

In an embodiment, the method further comprises monitoring a bit error rate of the coherent optical signal and the method is iterated until an increase in the bit error rate is detected. The method may enable the performance of an optical coherent channel to be automatically optimized, avoiding the usual costs of manual calibration at channel installation and increasing system margins during regular channel operation.

In an embodiment, the parameter comprises a frequency response of a digital filter used to generate the coherent optical signal. The method may control at least one of the shape and bandwidth of the coherent optical signal. The method may enable reconfiguration of transmission characteristics following a change in the propagation conditions experienced by the coherent optical signal.

In an embodiment, the at least one feedback variable is a set of error spectrum samples. The error spectrum samples are calculated as a difference between the spectrum samples and a set of reference spectrum samples of a predefined ideal spectrum of the coherent optical signal at detection. The frequency response of the digital filter is adjusted based on the error spectrum samples. Being able to adjust the frequency response of the digital filter may allow coherent optical signal throughput and performance to be maximized when link propagation conditions change, for example due to interfering spectrally adjacent optical signals being added. For example, if a coherent optical signal (also referred to as an optical channel) is routed on a new path with an increased number of ROADMs and co-propagating channels, the frequency response of the digital filter may be adjusted to reduce the bandwidth of the coherent optical signal, minimizing ROADM filtering penalty and inter-channel interference, ICI. The method may also enable the shape of the coherent optical signal to be adjusted in order to minimize inter-symbol interference, ISI.

In an embodiment, the frequency response of the digital filter is adjusted by adding the error spectrum samples to the frequency response of the digital filter.

In an embodiment, the method is iterated until the error spectrum samples have a predefined error value. The method may remove the need for manual calibration of the digital filter in field, reducing installation time and cost. The method may also enable automatic reconfiguration of transmission characteristics following a change in propagation conditions experienced by the coherent optical signal.

In an embodiment, the method further comprises transmitting the coherent optical signal to a coherent optical receiver, detecting the coherent optical signal and sampling the detected signal to generate the set of signal samples.

In an embodiment, the method further comprises communicating the feedback variable via one of an optical supervisory channel, a control plane or a network management system.

A second aspect of the invention provides coherent optical signal control apparatus comprising signal processing apparatus and a feedback controller. The signal processing apparatus is arranged to receive a set of signal samples relating to detection of a coherent optical signal. The signal processing apparatus is also arranged to transform the set of signal samples into a set of spectrum samples in the frequency domain, the set of spectrum samples being an estimation of the spectrum of the coherent optical signal. The feedback controller is arranged to calculate at least one feedback variable based on the spectrum samples and arranged to generate a feedback control signal configured to communicate the at least one feedback variable to be used to control a parameter in the generation of the coherent optical signal.

The apparatus may enable control of a parameter in the generation of a coherent optical signal in response to the spectrum of the coherent optical signal when detected. The apparatus takes advantage of the spectrum of a coherent optical signal typically varying slowly to calculate a feedback variable based on frequency domain spectrum samples, which may enable a more accurate feedback variable to be calculated. This may enable more accurate control of the parameter. The apparatus may enable reconfiguration of transmission characteristics following a change in the propagation conditions experienced by the coherent optical signal. The apparatus may allow a coherent optical signal to be configured to increase system margins during regular coherent optical channel operation. The apparatus may allow the performance of a coherent optical channel to be optimized without incurring the costs required to perform manual calibration during installation.

In an embodiment, the signal samples are equalizer output signals relating to detection of the coherent optical signal. The signal processing apparatus is arranged to store the equalizer output signals in a memory. The signal processing apparatus is arranged transform the set of signal samples by performing a Fourier transform on the stored equalizer output signals. The apparatus may be used on the equalizer output signals ("taps") generated during digital signal processing, DSP, following the detection of the coherent optical signal at a coherent receiver.

In an embodiment, the signal processing apparatus is arranged to calculate an impulse response of the coherent optical signal from the equalizer output signals and to perform a Fourier transform on the impulse response.

In an embodiment, the parameter comprises a driving voltage for an optical modulator used to generate the coherent optical signal. The apparatus may be used to control a nonlinear response of the optical modulator and thus the signal-to-noise ratio of the coherent optical signal. The apparatus may enable reconfiguration of transmission characteristics following a change in the propagation conditions experienced by the coherent optical signal.

In an embodiment, the parameter comprises a driving voltage for an IQ modulator used to generate the coherent optical signal. The apparatus may be used to control an optical modulator configured to apply quadrature phase-shift keying, QPSK, and dual-polarisation QPSK, DP-QPSK, modulation formats. It can also be applied to N-th order Quadrature amplitude modulation, nQAM, and dual-polarization nQAM.

In an embodiment, the at least one feedback variable comprises a non-linear modulation index. The feedback controller is arranged to calculate an effective bandwidth of the coherent optical signal at detection based on the spectrum samples. The feedback controller is arranged to calculate the non-linear modulation index comprising a ratio of the effective bandwidth and a predefined ideal effective bandwidth of the coherent optical signal at an output of a predefined ideal optical modulator.

The apparatus may enable the spectrum calculated by an equalizer at a coherent receiver to be used to estimate spectral broadening due to any non-linearity in an optical link that the coherent optical signal has been transmitted across and, based on this, the apparatus may provide a feedback variable to optimize the modulator driving voltage. The apparatus may calculate the non-linear modulation index exploiting DSP features usually present at a coherent receiver but used for different purposes. The apparatus may enable the performance of an optical coherent channel to be optimized, avoiding the usual costs of manual calibration at channel installation and increasing system margins during regular channel operation.

In an embodiment, the non-linear modulation index, NLMI, is given by:

$$NLMI = \frac{B_{eff}}{B_{ideal}} = \frac{1}{B_{ideal}T} \frac{\sum_{n=1}^{N} n|h_n|^2}{\sum_{n=1}^{N} |h_n|^2},$$

where T is a time window over which the Fourier transform is performed, N is the number of samples on which the Fourier transform is performed, and $h_n$ are the spectrum samples.

In an embodiment, the parameter comprises a frequency response of a digital filter used to generate the coherent optical signal. The apparatus may control at least one of the shape and bandwidth of the coherent optical signal. The apparatus may be used to reconfigure transmission characteristics of the coherent optical signal following a change in the propagation conditions experienced by the coherent optical signal.

In an embodiment, the at least one feedback variable comprises a set of error spectrum samples for adjusting the frequency response of the digital filter. The feedback controller is arranged to calculate the set of error spectrum samples as a difference between the spectrum samples and a set of reference spectrum samples of a predefined ideal spectrum of the coherent optical signal at the receiver.

Being able to adjust the frequency response of the digital filter may allow coherent optical signal throughput and performance to be maximized when link propagation conditions change, for example due to interfering spectrally adjacent optical signals being added. For example, if a coherent optical signal (also referred to as an optical channel) is routed on a new path with an increased number of ROADMs and co-propagating channels, the frequency response of the digital filter may be adjusted to reduce the bandwidth of the coherent optical signal, minimizing ROADM filtering penalty and inter-channel interference, ICI. The apparatus may also enable the shape of the coherent optical signal to be adjusted in order to minimize inter-symbol interference, ISI.

In an embodiment, the feedback control signal is communicated via one of an optical supervisory channel, OSC, a control plane and a network management system.

A third aspect of the invention provides a coherent optical receiver comprising coherent optical signal control apparatus. The coherent optical signal control apparatus comprises signal processing apparatus and a feedback controller. The signal processing apparatus is arranged to receive a set of signal samples relating to detection of a coherent optical signal. The signal processing apparatus is also arranged to transform the set of signal samples into a set of spectrum samples in the frequency domain, the set of spectrum samples being an estimation of the spectrum of the coherent optical signal. The feedback controller is arranged to calculate at least one feedback variable based on the spectrum samples and arranged to generate a feedback control signal configured to communicate the at least one feedback variable to be used to control a parameter in the generation of the coherent optical signal.

The coherent optical receiver may enable control of a parameter in the generation of a coherent optical signal in response to the spectrum of a detected coherent optical signal. The receiver takes advantage of the spectrum of a coherent optical signal typically varying slowly to calculate a feedback variable based on frequency domain spectrum samples, which may enable a more accurate feedback variable to be calculated. This may enable more accurate control of the parameter. The receiver may enable reconfiguration of transmission characteristics following a change in the propagation conditions experienced by the coherent optical signal. The receiver may allow a coherent optical signal to be configured to increase system margins during regular coherent optical channel operation. The receiver may allow the performance of a coherent optical channel to be optimized without incurring the costs required to perform manual calibration during installation.

In an embodiment, the coherent optical receiver comprises an optical detector and an equaliser. The optical detector is arranged to receive and detect the coherent optical signal, and generate an output signal comprising an indication of the detected coherent optical signal. The equalizer is arranged sample the output signal and to generate equalizer output signals. The signal processing apparatus is arranged to store the equalizer output signals in a memory. The signal processing apparatus is arranged transform the set of signal samples by performing a Fourier transform on the stored equalizer output signals.

In an embodiment, the signal processing apparatus is arranged to calculate an impulse response of the coherent optical signal from the equalizer output signals and to perform a Fourier transform on the impulse response.

In an embodiment, the parameter comprises a driving voltage for an optical modulator used to generate the coherent optical signal. The receiver may be used to control a nonlinear response of the optical modulator and thus the signal-to-noise ratio of the coherent optical signal. The receiver may enable reconfiguration of transmission characteristics following a change in the propagation conditions experienced by the coherent optical signal.

In an embodiment, the parameter comprises a driving voltage for an IQ modulator used to generate the coherent optical signal. The receiver may be used to control an optical modulator configured to apply quadrature phase-shift keying, QPSK, and dual-polarisation QPSK, DP-QPSK, modulation formats. It can also be applied to N-th order Quadrature amplitude modulation, nQAM, and dual-polarization nQAM.

In an embodiment, the at least one feedback variable comprises a non-linear modulation index. The feedback controller is arranged to calculate an effective bandwidth of the coherent optical signal at detection based on the spectrum samples. The feedback controller is arranged to calculate the non-linear modulation index comprising a ratio of the effective bandwidth and a predefined ideal effective bandwidth of the coherent optical signal at an output of a predefined ideal optical modulator.

The receiver may enable the spectrum calculated by the equalizer to be used to estimate spectral broadening due to any non-linearity in an optical link that the coherent optical signal has been transmitted across and, based on this, the receiver may provide a feedback variable to optimize the modulator driving voltage. The receiver may enable the performance of an optical coherent channel to be optimized, avoiding the usual costs of manual calibration at channel installation and increasing system margins during regular channel operation.

In an embodiment, the non-linear modulation index, NLMI, is given by:

$$NLMI = \frac{B_{eff}}{B_{ideal}} = \frac{1}{B_{ideal}T} \frac{\sum_{n=1}^{N} n|h_n|^2}{\sum_{n=1}^{N} |h_n|^2},$$

where T is a time window over which the Fourier transform is performed, N is the number of samples on which the Fourier transform is performed, and $h_n$ are the spectrum samples.

In an embodiment, the parameter comprises a frequency response of a digital filter used to generate the coherent optical signal. The receiver may control at least one of the shape and bandwidth of the coherent optical signal. The receiver may be used to reconfigure transmission characteristics of the coherent optical signal following a change in the propagation conditions experienced by the coherent optical signal.

In an embodiment, the at least one feedback variable comprises a set of error spectrum samples for adjusting the frequency response of the digital filter. The feedback controller is arranged to calculate the set of error spectrum samples as a difference between the spectrum samples and a set of reference spectrum samples of a predefined ideal spectrum of the coherent optical signal at the receiver.

Being able to adjust the frequency response of the digital filter may allow coherent optical signal throughput and performance to be maximized when link propagation conditions change, for example due to interfering spectrally adjacent optical signals being added. For example, if a coherent optical signal (also referred to as an optical channel) is routed on a new path with an increased number of ROADMs and co-propagating channels, the frequency response of the digital filter may be adjusted to reduce the bandwidth of the coherent optical signal, minimizing ROADM filtering penalty and inter-channel interference, ICI. The receiver may also enable the shape of the coherent optical signal to be adjusted in order to minimize inter-symbol interference, ISI.

In an embodiment, the feedback control signal is communicated via one of an optical supervisory channel, OSC, a control plane and a network management system.

A fourth aspect of the invention provides a coherent optical transmission system comprising an optical transmitter, an optical link, and a coherent optical receiver. The optical transmitter is arranged to generate and transmit a coherent optical signal. The optical transmitter comprises a transmitter controller arranged to control a parameter of the optical transmitter. The coherent optical receiver is located remote from the optical transmitter and is arranged to receive the coherent optical signal. The coherent optical receiver comprises detection apparatus, sampling apparatus and coherent optical signal control apparatus. The detection apparatus is arranged to detect the received signal. The sampling apparatus is arranged to sample the detected signal to generate a set of signal samples. The coherent optical signal control apparatus is arranged to receive the set of signal samples. The coherent optical signal control apparatus comprises signal processing apparatus and a feedback controller. The signal processing apparatus is arranged to receive a set of signal samples relating to detection of a coherent optical signal. The signal processing apparatus is also arranged to transform the set of signal samples into a set of spectrum samples in the frequency domain, the set of spectrum samples being an estimation of the spectrum of the coherent optical signal. The feedback controller is arranged to calculate at least one feedback variable based on the spectrum samples and arranged to generate a feedback control signal configured to communicate the at least one feedback variable to be used to control a parameter in the generation of the coherent optical signal. The transmitter controller is arranged to receive the feedback control signal and to adjust the parameter based on the at least one feedback variable.

In the coherent optical transmission system, a parameter in the generation of a coherent optical signal may be controlled at the transmitter in response to the spectrum of a coherent optical signal detected at the coherent optical receiver. The system takes advantage of the spectrum of a coherent optical signal typically varying slowly to enable a feedback variable to be calculated based on frequency domain spectrum samples, which may enable a more accurate feedback variable to be calculated. This may enable more accurate control of the parameter by the transmitter controller. The system may enable reconfiguration of its transmission characteristics following a change in the propagation conditions experienced by the coherent optical signal. In the coherent optical transmission system a coherent optical signal may be configured to increase system margins during regular coherent optical channel operation. Performance of a coherent optical channel may also be optimized without incurring the costs required to perform manual calibration during installation of the system.

In an embodiment, the coherent optical receiver comprises an optical detector and an equaliser. The optical detector is arranged to receive and detect the coherent optical signal, and generate an output signal comprising an indication of the detected coherent optical signal. The equalizer is arranged sample the output signal and to generate equalizer output signals. The signal processing apparatus is arranged to store the equalizer output signals in a memory. The signal processing apparatus is arranged transform the set of signal samples by performing a Fourier transform on the stored equalizer output signals.

In an embodiment, the equalizer comprises fast Fourier transform, FFT, apparatus arranged to perform the Fourier transform on the stored equalizer output signals.

In an embodiment, the signal processing apparatus is arranged to calculate an impulse response of the coherent optical signal from the equalizer output signals and to perform a Fourier transform on the impulse response. Spectrum samples may therefore be obtained where the equaliser does not comprise FFT apparatus.

In an embodiment, the transmitter comprises an optical modulator and the parameter comprises a driving voltage for the optical modulator. A nonlinear response of the optical modulator, and thus the signal-to-noise ratio of the coherent optical signal, may therefore be controlled. The coherent optical transmission system may reconfigure at least some of its transmission characteristics following a change in the propagation conditions experienced by the coherent optical signal.

In an embodiment, the transmitter comprises an IQ modulator.

In an embodiment, the at least one feedback variable comprises a non-linear modulation index. The feedback controller is arranged to calculate an effective bandwidth of the coherent optical signal at detection based on the spectrum samples. The feedback controller is arranged to calculate the non-linear modulation index comprising a ratio of the effective bandwidth and a predefined ideal effective bandwidth of the coherent optical signal at an output of a predefined ideal optical modulator.

The spectrum calculated by the equalizer may be used to estimate spectral broadening due to any non-linearity in an optical link and, based on this, the receiver may provide a feedback variable to optimize the modulator driving voltage. The performance of an optical coherent channel within the coherent optical transmission system may thus be optimized, avoiding the usual costs of manual calibration at channel installation and increasing system margins during regular channel operation.

In an embodiment, the non-linear modulation index, NLMI, is given by:

$$NLMI = \frac{B_{\it eff}}{B_{ideal}} = \frac{1}{B_{ideal}T} \frac{\sum_{n=1}^{N} n|h_n|^2}{\sum_{n=1}^{N} |h_n|^2},$$

where T is a time window over which the Fourier transform is performed, N is the number of samples on which the Fourier transform is performed, and $h_n$ are the spectrum samples.

In an embodiment, the transmitter comprises a digital filter and the parameter comprises a frequency response of the digital filter. The spectrum of the coherent optical signal comprises a spectral response comprising a transmission filter response, a spectral response of the optical link and a spectral response of the receiver. At least one of the shape and bandwidth of the coherent optical signal may be controlled in the coherent optical transmission system. Transmission characteristics of the coherent optical signal may be reconfigured following a change in the propagation conditions within the coherent optical transmission system.

In an embodiment, the at least one feedback variable comprises a set of error spectrum samples for adjusting the frequency response of the digital filter. The feedback controller is arranged to calculate the set of error spectrum samples as a difference between the spectrum samples and a set of reference spectrum samples of a predefined ideal spectrum of the coherent optical signal at the receiver.

Being able to adjust the frequency response of the digital filter may allow coherent optical signal throughput and performance to be maximized when link propagation conditions change, for example due to interfering spectrally adjacent optical signals being added. For example, if a coherent optical signal (also referred to as an optical channel) is routed on a new path with an increased number of ROADMs and co-propagating channels, the frequency response of the digital filter may be adjusted to reduce the bandwidth of the coherent optical signal, minimizing ROADM filtering penalty and inter-channel interference, ICI. The shape of the coherent optical signal to be adjusted in order to minimize inter-symbol interference, ISI within the coherent optical transmission system.

In an embodiment, the transmitter controller is arranged to add the error spectrum samples to the filter response of the digital filter.

In an embodiment, the digital filter is a digital-to-analogue converter, DCA.

In an embodiment, the coherent optical transmission system comprises at least one of an optical supervisory channel, OSC, a control plane and a network management system via which the feedback control signal is communicated to the transmitter controller.

A fifth aspect of the invention provides a computer program, comprising instructions which, when executed on at least one processor, cause the at least one processor to carry out any of the above steps of the method of controlling a parameter in the generation of a coherent optical signal.

A sixth aspect of the invention provides a data carrier having computer readable instructions embodied therein. The said computer readable instructions are for providing access to resources available on a processor. The computer readable instructions comprise instructions to cause the processor to perform any of the above steps of the method of controlling a parameter in the generation of a coherent optical signal.

In an embodiment, the data carrier is a non-transitory data carrier.

Embodiments of the invention will now be described, by way of example only, with reference to the accompanying drawings.

DETAILED DESCRIPTION

The same reference numbers will used for corresponding features in different embodiments.

Figure 1:
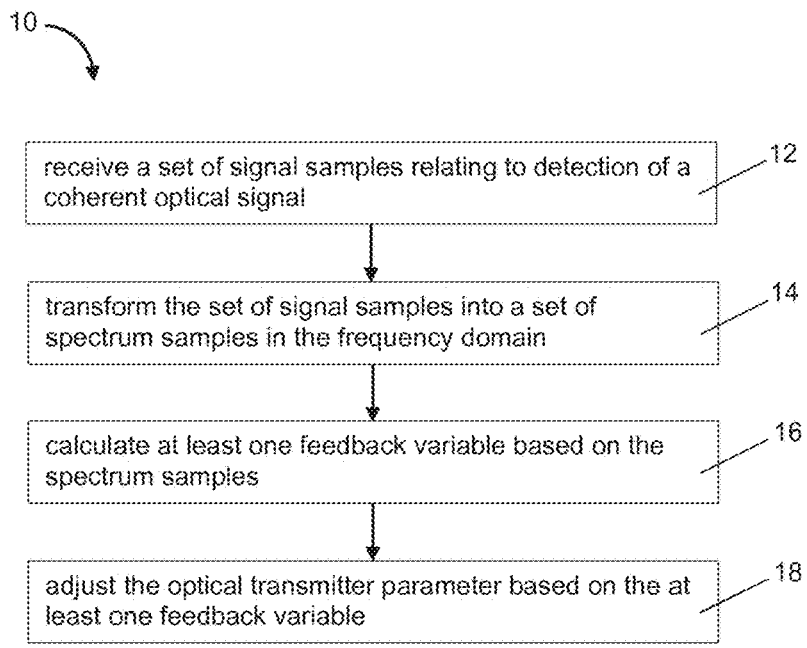
FIG. 1 shows the steps of a method according to a first embodiment of the invention of controlling a parameter in the generation of a coherent optical signal.

Referring to FIG. 1, a first embodiment of the invention provides method 10 of controlling a parameter in the generation of a coherent optical signal.

The method comprises the following steps:

receiving a set of signal samples relating to detection of a coherent optical signal (12);

transforming the set of signal samples into a set of spectrum samples in the frequency domain (14);

calculating at least one feedback variable based on the spectrum samples (16); and adjusting the parameter based on the at least one feedback variable (18).

The set of spectrum samples are an estimation of the spectrum of the coherent optical signal at detection.

Figure 2:
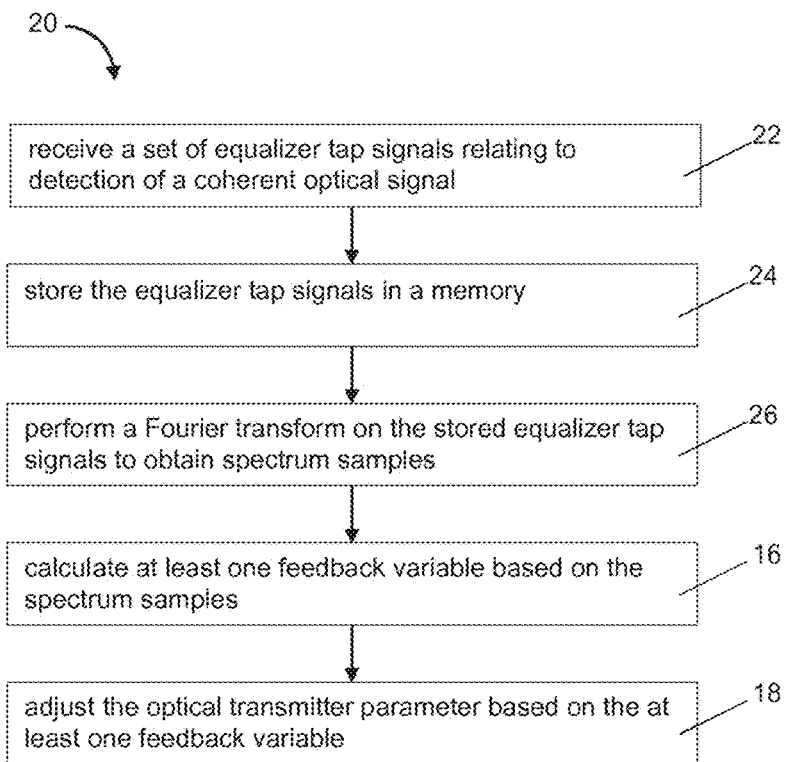
FIG. 2 shows the steps of a method according to a second embodiment of the invention of controlling a parameter in the generation of a coherent optical signal.

FIG. 2 shows the steps of a method 20 of controlling a parameter in the generation of a coherent optical signal, according to a second embodiment of the invention.

In this embodiment, the method commences with receiving signal samples in the form of equalizer output signals (also known as equalizer "taps") relating to detection of a coherent optical signal 22. The equalizer output signals are stored in a memory 24 and a Fourier transform is performed on the stored equalizer output signals to obtain spectrum samples 26.

Figure 3:
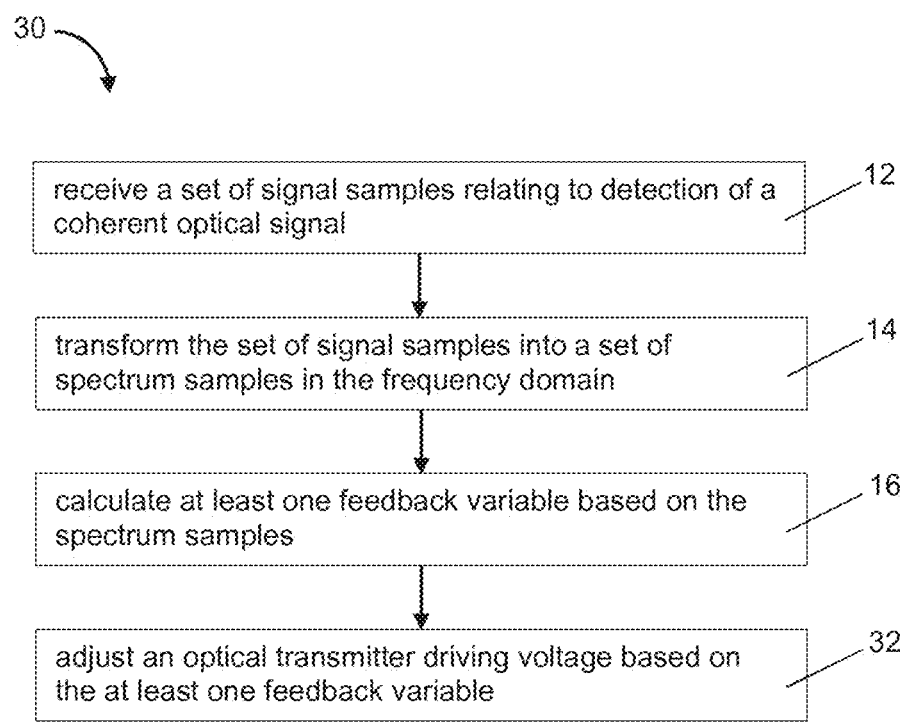
FIG. 3 shows the steps of a method according to a third embodiment of the invention of controlling a parameter in the generation of a coherent optical signal.

A third embodiment of the invention provides a method 30 of controlling a parameter in the generation of a coherent optical signal having the steps shown in FIG. 3. The method of this embodiment is similar to the method 10 shown in FIG. 1, with the following modifications.

In this embodiment, the parameter to be controlled comprises a driving voltage for an optical modulator used to generate the coherent optical signal. The optical transmitter driving voltage is adjusted based on the calculated feedback variable 32.

Figure 4:
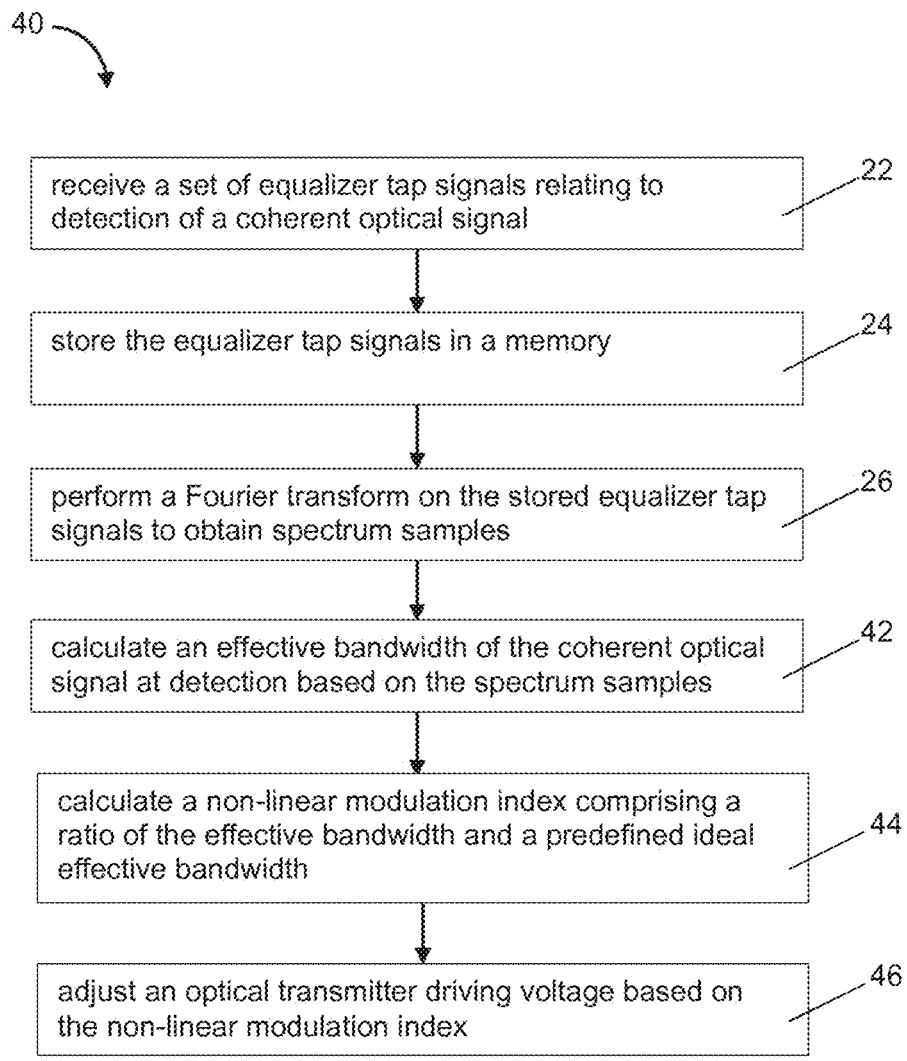
FIG. 4 shows the steps of a method according to a fourth embodiment of the invention of controlling a parameter in the generation of a coherent optical signal.

FIG. 4 shows the steps of a method 40 of controlling a parameter in the generation of a coherent optical signal, according to a fourth embodiment of the invention. The method of this embodiment is similar to the method 20 shown in FIG. 2, with the following modifications.

As in the previous embodiment, the parameter to be controlled comprises a driving voltage for an optical modulator used to generate the coherent optical signal. The feedback variable comprises a non-linear modulation index, NLMI, comprising a ratio of an effective bandwidth, $B_{eff}$, of the coherent optical signal at detection and a predefined ideal effective bandwidth, $B_{ideal}$, of the coherent optical signal at an output of a predefined ideal optical modulator.

The effective bandwidth is calculated based on the spectrum samples 42 and the NLMI is calculated using the calculated effective bandwidth and the ideal effective bandwidth 44. The optical transmitter driving voltage is adjusted based on the NLMI 46.

Figure 5:
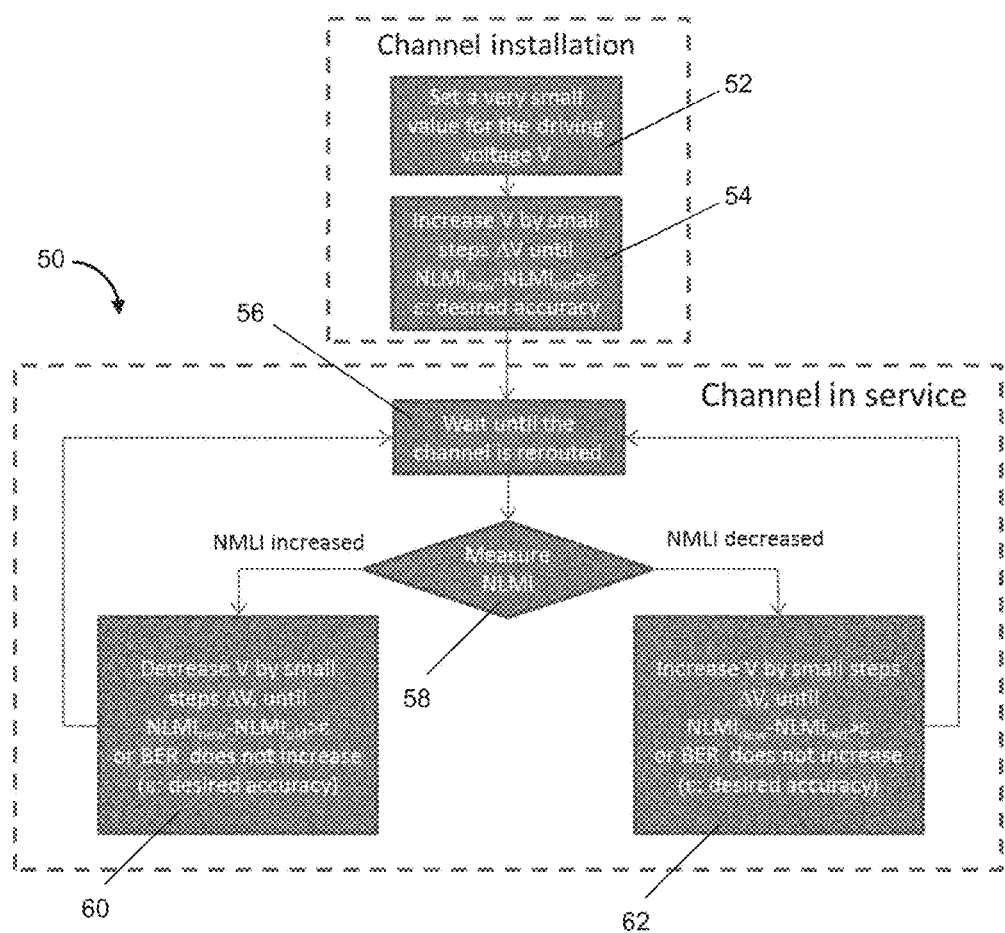
FIG. 5 shows the steps of a method of installing an optical channel and adjusting the bandwidth of the optical channel using a method according to a fifth embodiment of the invention of controlling a parameter in the generation of a coherent optical signal.

FIG. 5 illustrates a method of installing an optical channel and adjusting the bandwidth of the coherent optical signal using a method 50 of controlling a parameter in the generation of a coherent optical signal, according to a fifth embodiment of the invention. The method of this embodiment is similar to the method 40 of the previous embodiment, with the following modifications.

In the method 50 of this embodiment a fast Fourier transform, FFT, is performed on the equalizer output signals. The NLMI is given by the equation:

$$NLMI = \frac{B_{eff}}{B_{ideal}} = \frac{1}{B_{ideal}T} \frac{\sum_{n=1}^{N} n|h_n|^2}{\sum_{n=1}^{N} |h_n|^2}$$

where T is the time window over which the equalizer output signals are collected, N is the FFT length and $h_n$ are the spectrum samples calculated by the FFT.

The NLMI is 1 for a linear optical channel and is >1 when the optical channel experiences non-linearity.

At channel installation, the optical modulator driving voltage is initially set to a very small voltage value to ensure that the modulator does not introduce any non-linear distortions 52. Any observed spectrum broadening of the coherent optical signal with respect to the ideal shape will therefore be caused by the optical link across which the signal is transmitted. In order to optimise the signal to noise ratio of the transmitted (and received) coherent optical signal, the driving voltage is gradually increased until the difference in subsequent values of the NLMI is greater than a desired accuracy, ε, 55, indicating that additional spectral broadening due to the optical modulator is detected, meaning that the optical modulator has started to introduce a non-linear penalty. Modifying the voltage then stops until the channel is rerouted 56.

When the channel is rerouted onto a different path, the NLMI is measured 58 and if a NLMI decrease is observed (meaning the optical link is more linear), the driving voltage is increased in small steps, as during installation, to increase the signal to noise ratio 62. The bit error rate, BER, is also monitored as the driving voltage is modified; the voltage is increased until an increase in the BER is detected. If an NLMI increase is observed (i.e. if the new link introduces more non-linear penalty), the driving voltage is decreased in small steps until the difference in subsequent values of the NLMI is greater than the desired accuracy; the voltage is decreased until any associated increase in the BER has been reversed.

Figure 6:
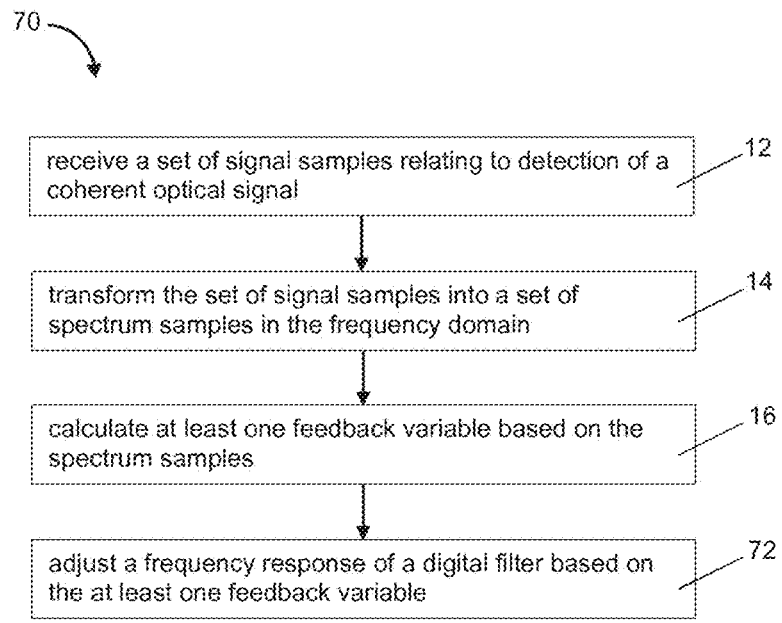
FIG. 6 shows the steps of a method according to a sixth embodiment of the invention of controlling a parameter in the generation of a coherent optical signal.

FIG. 6 shows the steps of a method 70 of controlling a parameter in the generation of a coherent optical signal, according to a sixth embodiment of the invention. The method of this embodiment is similar to the method 10 shown in FIG. 1, with the following modifications.

In this embodiment, the parameter to be controlled comprises a frequency response of a digital filter used to generate the coherent optical signal. The frequency response of the digital filter is adjusted based on the calculated feedback variable 72.

Figure 7:
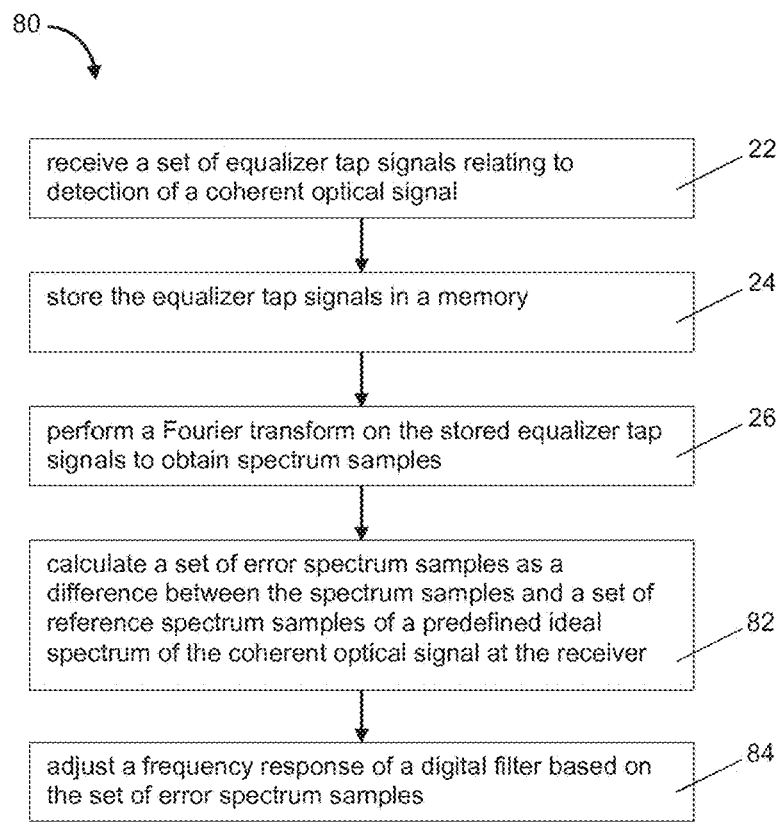
FIG. 7 shows the steps of a method according to a seventh embodiment of the invention of controlling a parameter in the generation of a coherent optical signal.

FIG. 7 shows the steps of a method 80 of controlling a parameter in the generation of a coherent optical signal, according to a seventh embodiment of the invention. The method of this embodiment is similar to the method 20 shown in FIG. 2, with the following modifications.

As in the previous embodiment, the parameter to be controlled comprises a frequency response of a digital filter used to generate the coherent optical signal. The feedback variable comprises a set of error spectrum samples. The error spectrum samples are calculated as a difference between the spectrum samples and a set of reference spectrum samples of a predefined ideal spectrum of the coherent optical signal at detection 82. The frequency response of the digital filter is adjusted based on the error spectrum samples 84.

Figure 8:
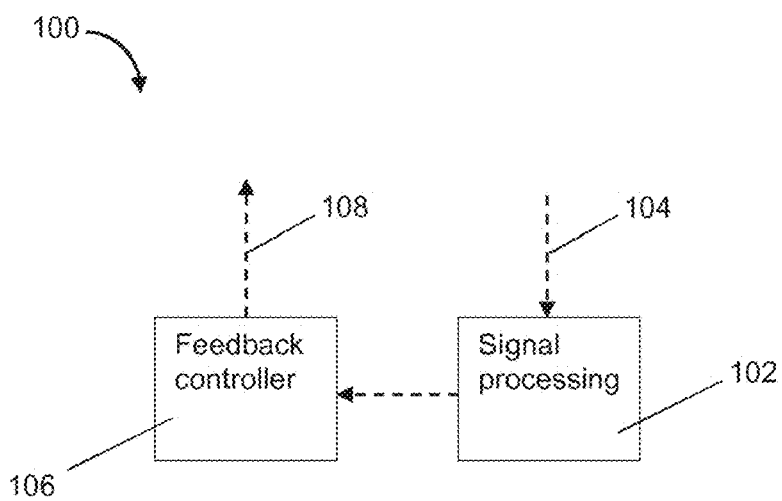
FIG. 8 is a schematic representation of coherent optical signal control apparatus according to the eighth to fourteenth embodiments of the invention.

Referring to FIG. 8, an eighth embodiment of the invention provides coherent optical signal control apparatus 100 comprising signal processing apparatus 102 and a feedback controller 106.

The signal processing apparatus 102 is arranged to receive a set of signal samples 104 relating to detection of a coherent optical signal. The signal processing apparatus is also arranged to transform the set of signal samples into a set of spectrum samples in the frequency domain. The set of spectrum samples is an estimation of the spectrum of the coherent optical signal.

The feedback controller 106 is arranged to calculate at least one feedback variable based on the spectrum samples. The feedback controller is also arranged to generate a feedback control signal 108 configured to communicate the at least one feedback variable to be used to control a parameter in the generation of the coherent optical signal.

A ninth embodiment provides coherent optical signal control apparatus which has the same general structure as the apparatus shown in FIG. 8, and which will be described with reference to that Figure.

In this embodiment, the signal processing apparatus 102 is arranged to receive a set of equalizer output signals relating to detection of the coherent optical signal. The signal processing apparatus is arranged to store the equalizer output signals in a memory and to transform the set of signal samples by performing a Fourier transform on the stored equalizer output signals.

A tenth embodiment provides coherent optical signal control apparatus which is similar to the previous embodiment and which has the same general structure as the apparatus shown in FIG. 8, and which will be described with reference to that Figure.

The feedback controller 106 is arranged to generate a feedback control signal 108 configured to communicate a feedback variable to be used to control a driving voltage for an optical modulator used to generate the coherent optical signal.

An eleventh embodiment provides coherent optical signal control apparatus which is similar to the previous embodiment and which has the same general structure as the apparatus shown in FIG. 8, and which will be described with reference to that Figure.

In this embodiment, the feedback variable comprises a non-linear modulation index, NLMI. The feedback controller 106 is arranged to calculate an effective bandwidth, $B_{eff}$, of the coherent optical signal at detection based on the spectrum samples. The feedback controller is arranged to calculate the NLMI comprising a ratio of the effective bandwidth and a predefined ideal effective bandwidth, $B_{ideal}$, of the coherent optical signal at an output of a predefined ideal optical modulator.

A twelfth embodiment provides coherent optical signal control apparatus which is similar to the previous embodiment and which has the same general structure as the apparatus shown in FIG. 8, and which will be described with reference to that Figure.

In this embodiment, the signal processing apparatus 102 is arranged to perform fast Fourier transform, FFT, on the stored equalizer output signals.

The feedback controller 106 is arranged to calculate the NLMI using the equation:

$$NLMI = \frac{B_{eff}}{B_{ideal}} = \frac{1}{B_{ideal}T} \frac{\sum_{n=1}^{N} n|h_n|^2}{\sum_{n=1}^{N} |h_n|^2}$$

where T is the time window over which the equalizer output signals are collected, N is the FFT length and $h_n$ are the spectrum samples calculated by the FFT.

A thirteenth embodiment provides coherent optical signal control apparatus which is similar to the ninth embodiment and which has the same general structure as the apparatus shown in FIG. 8, and which will be described with reference to that Figure.

The feedback controller 106 is arranged to generate a feedback control signal 108 configured to communicate a feedback variable to be used to control a frequency response of a digital filter used to generate the coherent optical signal.

A fourteenth embodiment provides coherent optical signal control apparatus which is similar to the previous embodiment and which has the same general structure as the apparatus shown in FIG. 8, and which will be described with reference to that Figure.

In this embodiment, the feedback variable comprises a set of error spectrum samples. The feedback controller 106 is arranged to calculate a set of error spectrum samples as a difference between the spectrum samples and a set of reference spectrum samples of a predefined ideal spectrum of the coherent optical signal at the receiver.

Figure 9:
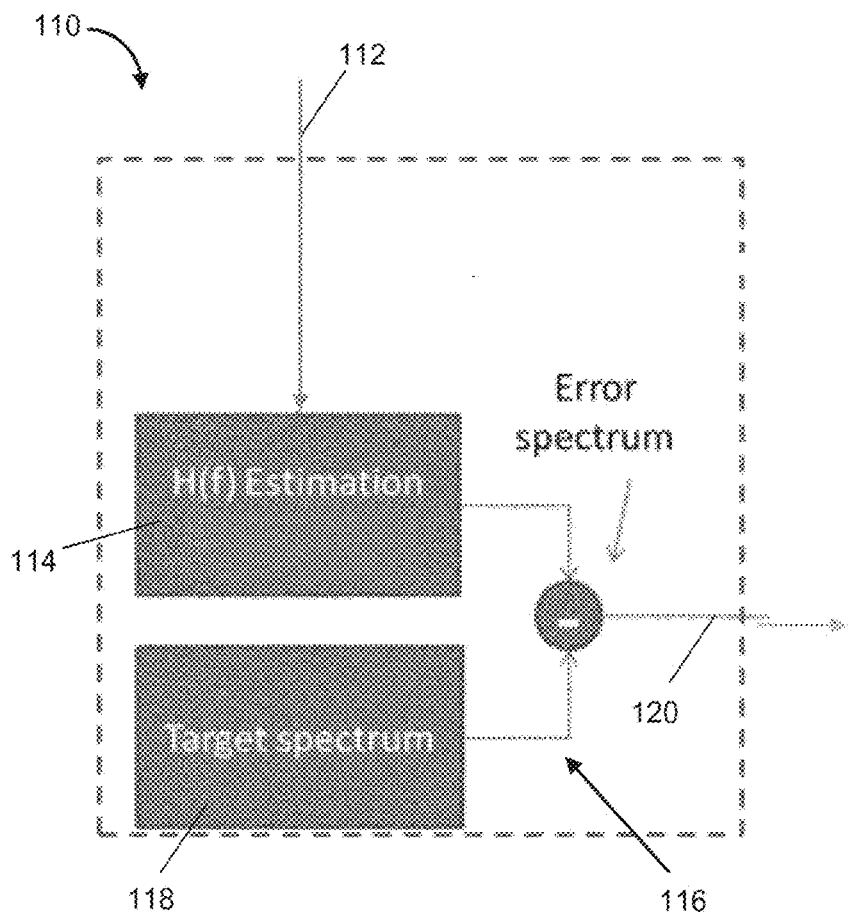
FIG. 9 is a schematic representation of a coherent optical signal control apparatus according to a fifteenth embodiment of the invention.

Referring to FIG. 9, a fifteenth embodiment of the invention provides coherent optical signal control apparatus which is similar to the ninth embodiment, with the following modifications.

In this embodiment, the signal processing apparatus 114 is arranged to receive a set of equalizer output signals 112 relating to detection of the coherent optical signal. The signal processing apparatus is arranged to store the equalizer output signals in a memory and to transform the set of signal samples by performing a fast Fourier transform, FFT, on the stored equalizer output signals, to obtain a set of spectrum samples. The feedback controller 120 is arranged to calculate a set of error spectrum samples as the difference between the spectrum samples and a set of reference spectrum samples 118 of a predefined target spectrum of the coherent optical signal at the receiver.

Figure 10:
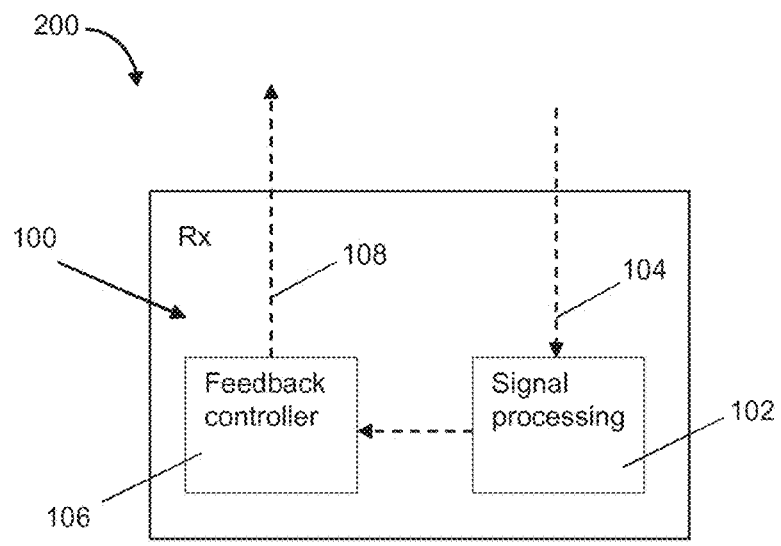
FIG. 10 is a schematic representation of a coherent optical receiver according to a sixteenth embodiment of the invention.

A sixteenth embodiment of the invention provides a coherent optical receiver 200 as shown in FIG. 10. The receiver, Rx, 200 comprises coherent optical signal control apparatus 100, as shown in FIG. 8 and described above in any one of the eighth to fourteenth embodiments.

Figure 11:
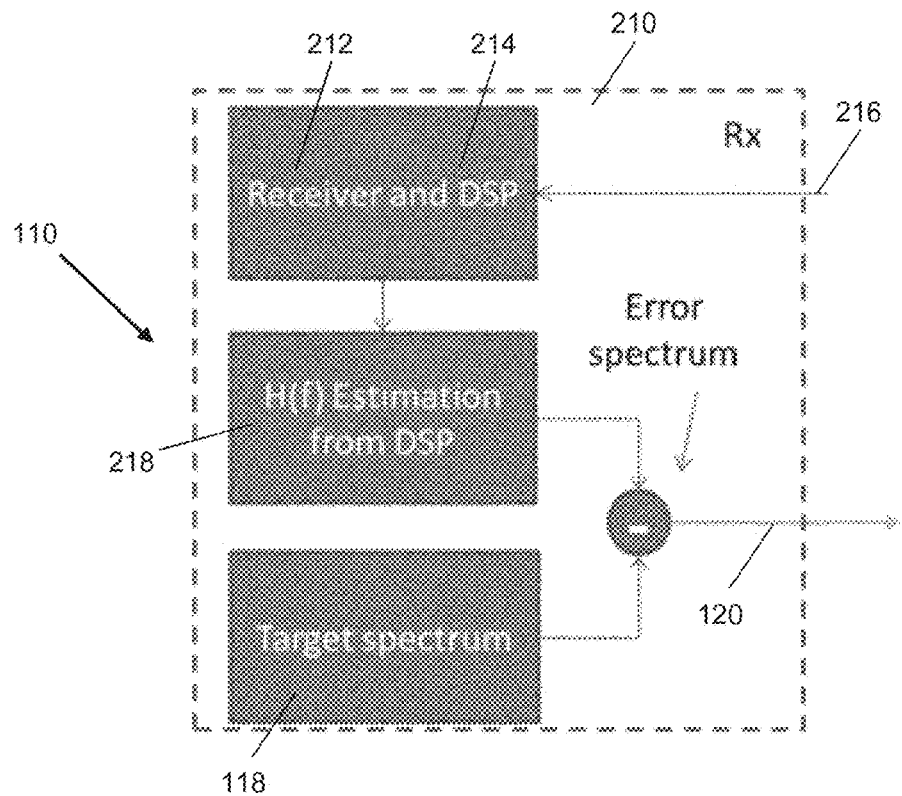
FIG. 11 is a schematic representation of a coherent optical receiver according to an seventeenth embodiment of the invention.

FIG. 11 shows a coherent optical receiver 210 according to a seventeenth embodiment of the invention. The receiver 210 comprises receiver apparatus 212, DSP apparatus 214 and coherent optical signal control apparatus 110 as described above with reference to FIG. 9.

The receiver apparatus 212 is arranged to receive and detect a coherent optical signal 216. The DSP apparatus 214 comprises an equalizer and FFT apparatus, and is arranged to generate and store a set of equalizer output signals, and to perform an FFT on the stored equalizer output signals, to provide a set of spectrum samples ("H(f) estimation") 218.

Figure 12:
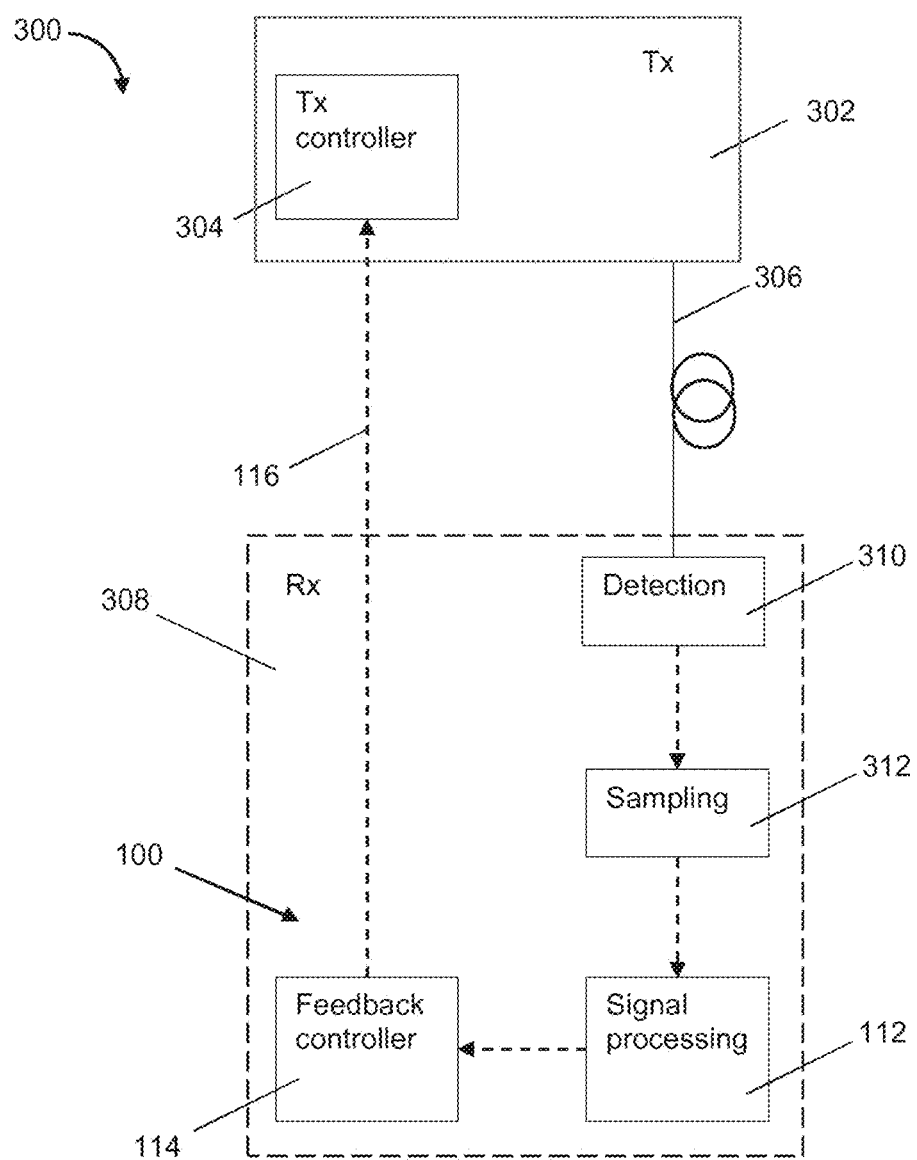
FIG. 12 is a schematic representation of a coherent optical transmission system according to an eighteenth embodiment of the invention.

Referring to FIG. 12, an eighteenth embodiment of the invention provides a coherent transmission system 300 comprising an optical transmitter 302, an optical link 306, and a coherent optical receiver 308.

The optical transmitter 302 is arranged to generate and transmit a coherent optical signal. The optical transmitter comprises a transmitter controller 304 arranged to control a parameter of the optical transmitter.

The optical link 306 extends between the optical transmitter 302 and the coherent optical receiver 308, and delivers the coherent optical signal from the optical transmitter to the coherent optical receiver.

The coherent optical receiver 308 is located remote from the optical transmitter and is arranged to receive the coherent optical signal. The coherent optical receiver comprises detection apparatus 310 and sampling apparatus 312. The detection apparatus is arranged to detect the received signal and the sampling apparatus is arranged to sample the detected signal to generate a set of signal samples.

The coherent optical signal control apparatus 100 is arranged to receive the set of signal samples from the sampling apparatus. The coherent optical signal control apparatus is as described above with reference to FIG. 8. It will be appreciated that any of the above described coherent optical signal control apparatus may be used in the coherent optical receiver 308.

The transmitter controller is arranged to receive the feedback control signal 116 and is arranged to adjust the parameter based on the at least one feedback variable generated by the feedback controller 114.

Figure 13:
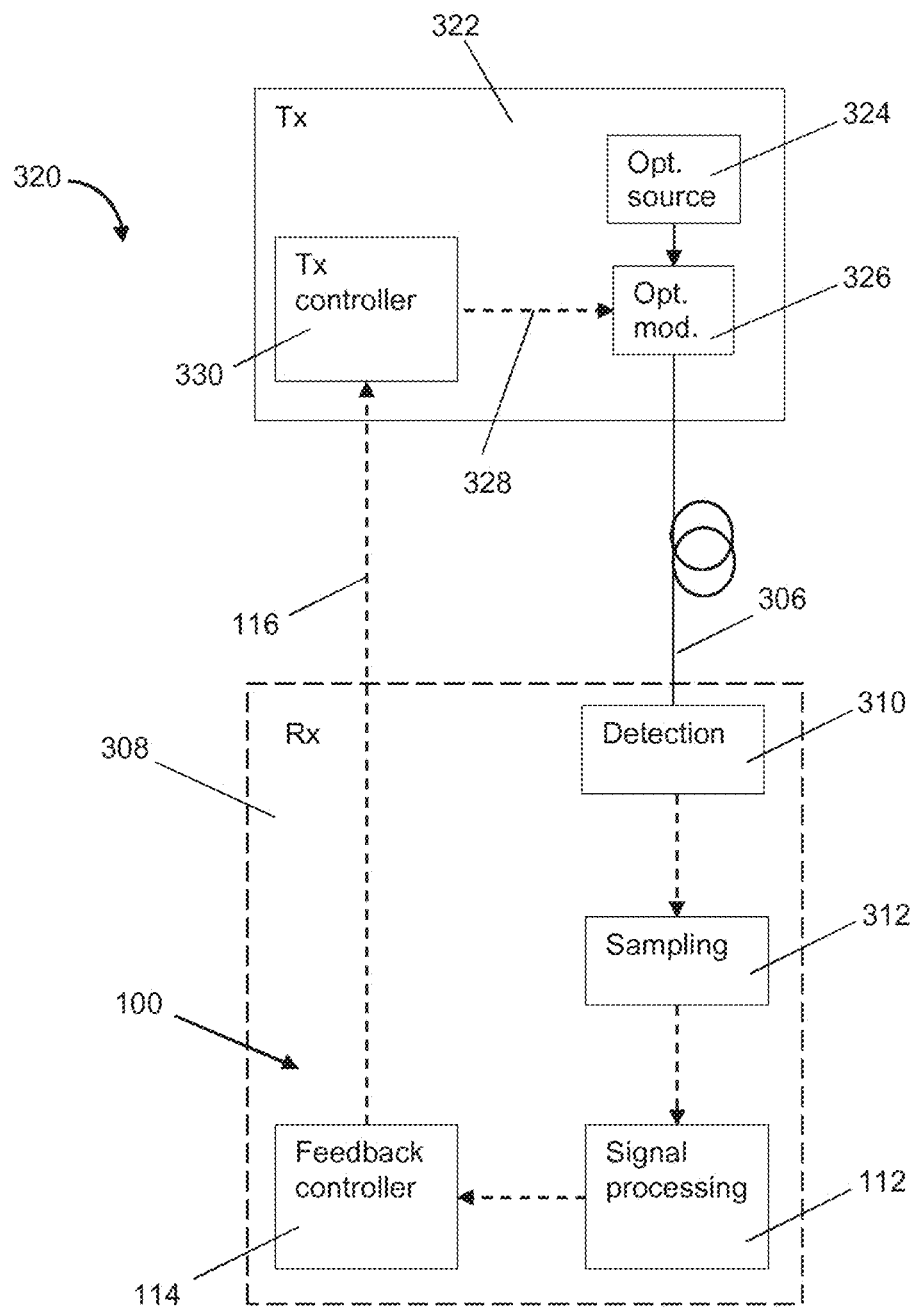
FIG. 13 is a schematic representation of a coherent optical transmission system according to a nineteenth embodiment of the invention.

A coherent transmission system 320 according to a nineteenth embodiment of the invention is shown in FIG. 13. The system 320 of this embodiment is similar to the system 300 of the previous embodiment, with the following modifications.

In this embodiment, the transmitter 322 comprises an optical source 324 and an optical modulator 326. The transmitter controller 330 is arranged to generate a control signal 328 arranged to control a driving voltage of the optical modulator.

Figure 14:
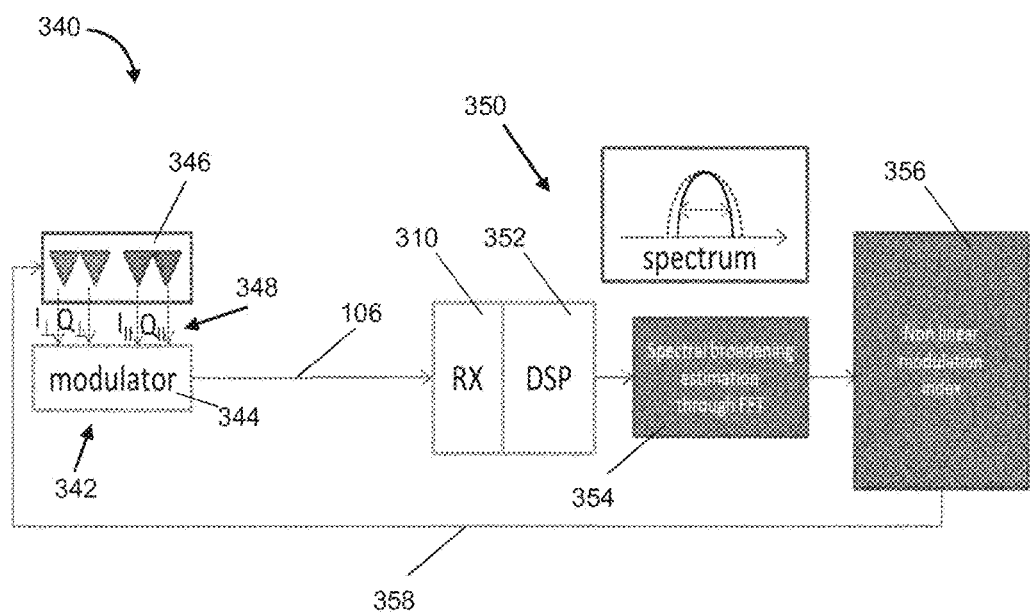
FIG. 14 is a schematic representation of a coherent optical transmission system according to a twentieth embodiment of the invention.

FIG. 14 shows a coherent transmission system 340 according to a twentieth embodiment of the invention. The coherent transmission system 340 is similar to the system of the previous embodiment and comprises a transmitter 342 comprising a dual-polarisation IQ modulator 344 and a transmitter controller 346. The sampling apparatus comprises DSP apparatus 352 comprising an equalizer, which is arranged to sample the detected signal to generate a set of equalizer output signals. The signal processing apparatus 354 is arranged to perform an FFT on the equalizer output signals and the feedback controller 356 is arranged to calculate a nonlinear modulation index, NLMI, as described above, and to communicate the NLMI to the transmitter controller 346 via an optical supervisory channel, OSC, 358 of the system.

Figure 15:
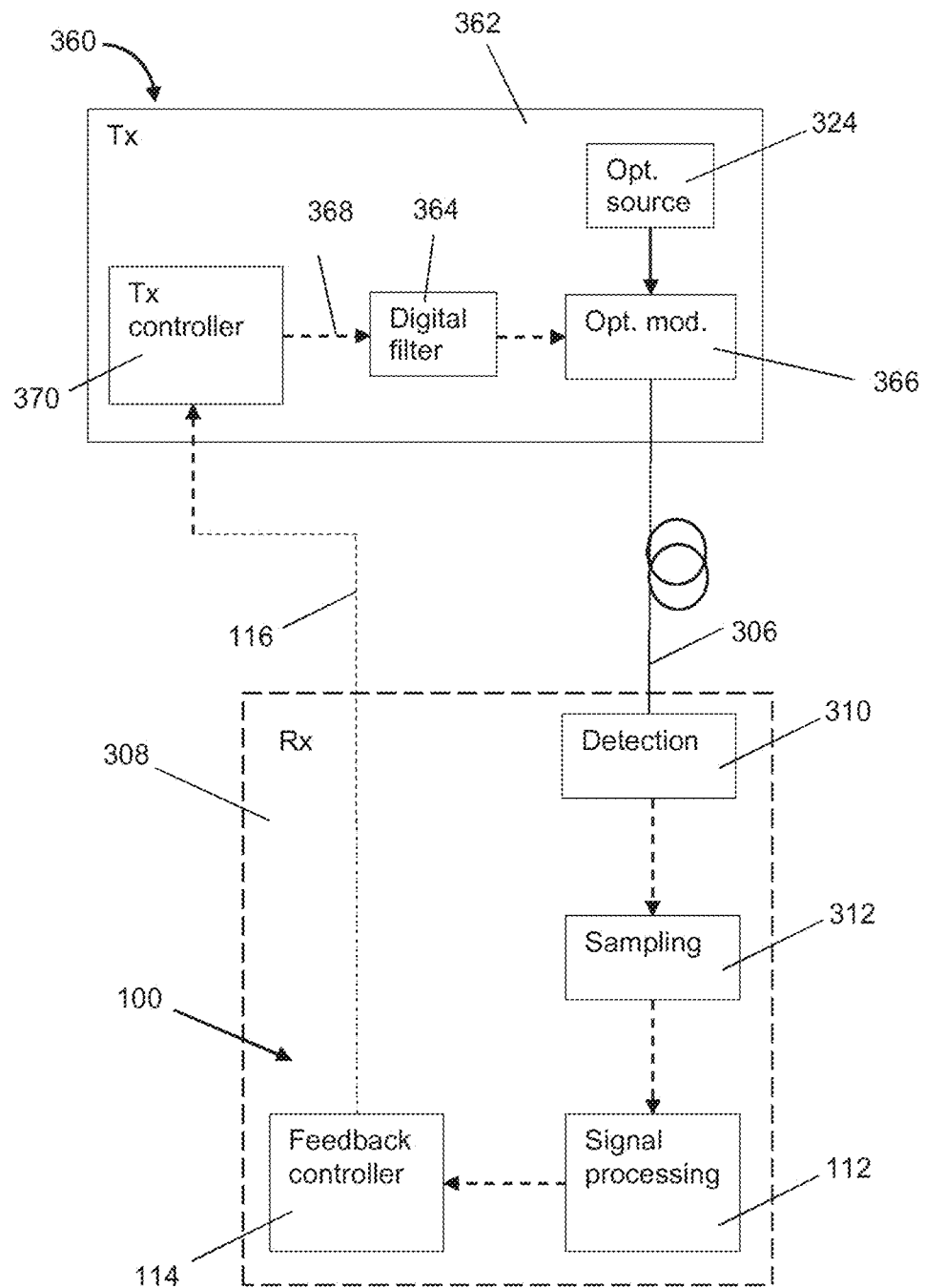
FIG. 15 is a schematic representation of a coherent optical transmission system according to a twenty-first embodiment of the invention.

A twenty-first embodiment of the invention provides a coherent transmission system 360, as shown in FIG. 15, which is similar to the system 320 of the nineteenth embodiment, with the following modifications.

In this embodiment, the transmitter 362 comprises an optical source 324, a digital filter 364 and an optical modulator 366. The transmitter controller 370 is arranged to generate a control signal 368 arranged to control a filter response of the digital filter 364.

Figure 16:
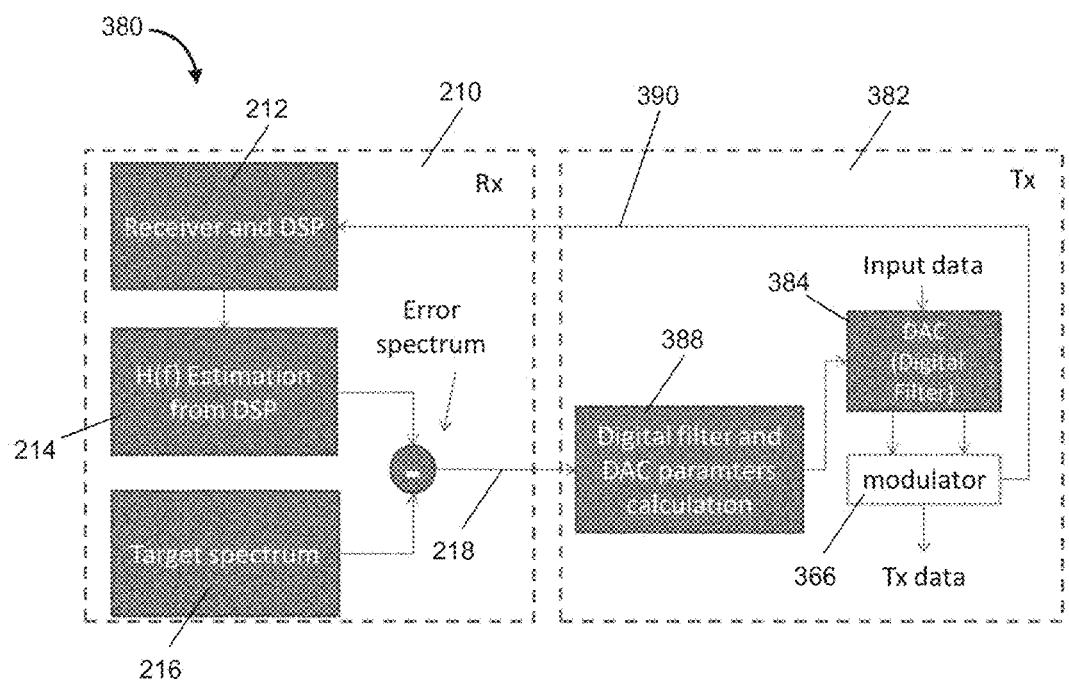
FIG. 16 is a schematic representation of a coherent optical transmission system according to a twenty-second embodiment of the invention.

Referring to FIG. 16, a twenty-second embodiment of the invention provides a coherent optical transmission system 380 which is similar to the system 360 of the previous embodiment, with the following modifications.

In this embodiment, a coherent receiver 210 as shown in FIG. 11 is used and the transmitter 382 comprises a DAC 384. The transmitter controller 388 is arranged to calculate the digital filter (DAC) parameters.

In operation, at the coherent receiver 210, the spectral response given by transmission filter, optical link (fibre and ROADMs), receiver front end and DSP equalizer is estimated by monitoring the equalizer output signals ("taps") and making a FFT. Then, an error spectrum is calculated by difference with a known optical frequency response. The set of error samples are then communicated to the transmitter 382, where the shape of the transmission digital filter is calculated and the DAC 384 configured accordingly. The process can be iterated until a desired accuracy in the set of error samples is reached.

The invention claimed is:

1. A method of controlling a parameter in the generation of a coherent optical signal, the method comprising the steps of:
   receiving a set of signal samples relating to detection of a coherent optical signal;
   transforming the set of signal samples into a set of spectrum samples in the frequency domain, the set of spectrum samples being an estimation of the spectrum of the coherent optical signal;
   calculating at least one feedback variable based on the spectrum samples; and
   adjusting the parameter based on the at least one feedback variable,
   wherein the parameter comprises a driving voltage for an optical modulator used to generate the coherent optical signal; and
   wherein the at least one feedback variable comprises a non-linear modulation index indicating an effective bandwidth of the coherent optical signal at detection, and the effective bandwidth is calculated based on the spectrum samples, and wherein the driving voltage is adjusted in inverse proportion to the non-linear modulation index.

2. A method as claimed in claim 1, wherein the signal samples are equalizer output signals relating to detection of the coherent optical signal and the method comprises storing the equalizer output signals in a memory and the step of transforming the set of signal samples comprises performing a Fourier transform on the stored equalizer output signals.

3. A method as claimed in claim 1, wherein the non-linear modulation index comprises a ratio of the effective bandwidth of the coherent optical signal at detection and a predefined ideal effective bandwidth of the coherent optical signal at an output of a predefined ideal optical modulator.

4. A method as claimed in claim 1, wherein the parameter comprises a frequency response of a digital filter used to generate the coherent optical signal.

5. A method as claimed in claim 4, wherein the at least one feedback variable is a set of error spectrum samples and the error spectrum samples are calculated as a difference between the spectrum samples and a set of reference spectrum samples of a predefined ideal spectrum of the coherent optical signal at detection, and wherein the frequency response of the digital filter is adjusted based on the error spectrum samples.

6. A coherent optical signal control apparatus comprising:
   a signal processor, wherein the signal processor is arranged to receive a set of signal samples relating to detection of a coherent optical signal and arranged to transform the set of signal samples into a set of spectrum samples in the frequency domain, the set of spectrum samples being an estimation of the spectrum of the coherent optical signal; and
   a feedback controller arranged to calculate at least one feedback variable based on the spectrum samples and arranged to generate a feedback control signal configured to communicate the at least one feedback variable to be used to control a parameter in the generation of the coherent optical signal,
   wherein the parameter comprises a driving voltage for an optical modulator used to generate the coherent optical signal; and
   wherein the at least one feedback variable comprises a non-linear modulation index and wherein the feedback controller is arranged to calculate an effective bandwidth of the coherent optical signal at detection based on the spectrum samples, and the feedback controller is arranged to calculate the non-linear modulation index indicating the effective bandwidth.

7. The coherent optical signal control apparatus as claimed in claim 6, wherein the signal processor is arranged to receive a set of equalizer output signals relating to detection of the coherent optical signal and the signal processor is arranged to store the equalizer output signals in a memory and to transform the set of signal samples by performing a Fourier transform on the stored equalizer output signals.

8. The coherent optical signal control apparatus as claimed in claim 6, wherein the feedback controller is arranged to calculate the non-linear modulation index comprising a ratio of the effective bandwidth and a predefined ideal effective bandwidth of the coherent optical signal at an output of a predefined ideal optical modulator.

9. The coherent optical signal control apparatus as claimed in claim 6, wherein the parameter comprises a frequency response of a digital filter used to generate the coherent optical signal.

10. The coherent optical signal control apparatus as claimed in claim 9, wherein the at least one feedback variable comprises a set of error spectrum samples and the feedback controller is arranged to calculate the set of error spectrum samples as a difference between the spectrum samples and a set of reference spectrum samples of a predefined ideal spectrum of the coherent optical signal at the receiver.

11. A coherent optical receiver comprising the coherent optical signal control apparatus as claimed in claim 6.

12. A coherent optical transmission system comprising:
   an optical transmitter arranged to generate and transmit a coherent optical signal, the optical transmitter comprising a transmitter controller arranged to control a parameter of the optical transmitter; an optical link; and
   a coherent optical receiver located remote from the optical transmitter and arranged to receive the coherent optical signal, the receiver comprising:
      detection apparatus arranged to detect the received signal; and
      sampling apparatus arranged to sample the detected signal to generate a set of signal samples; and
      the coherent optical signal control apparatus as claimed in claim 6,
   wherein the transmitter controller is arranged to receive the feedback control signal and to adjust the parameter based on the at least one feedback variable.

13. A nontransitory computer readable storage medium comprising instructions which, when executed on at least one processor, cause the at least one processor to carry out a method of controlling a parameter in the generation of a coherent optical signal, the method comprising the steps of:

receiving a set of signal samples relating to detection of a coherent optical signal;

transforming the set of signal samples into a set of spectrum samples in the frequency domain, the set of spectrum samples being an estimation of the spectrum of the coherent optical signal;

calculating at least one feedback variable based on the spectrum samples; and adjusting the parameter based on the at least one feedback variable, wherein the parameter comprises a driving voltage for an optical modulator used to generate the coherent optical signal; and wherein the at least one feedback variable comprises a non-linear modulation index indicating an effective bandwidth of the coherent optical signal at detection, and the effective bandwidth is calculated based on the spectrum samples, and wherein the driving voltage is adjusted in inverse proportion to the non-linear modulation index.

* * * * *